United States Patent Office 2,823,863
Patented Feb. 18, 1958

2,823,863

MEANS FOR SUPPLYING STERILIZED GAS UNDER PRESSURE

Sidney James Edgar Moyes, Farnborough, England, assignor to Power Jets (Research and Development) Limited, London, England, a British company Application May 2, 1955, Serial No. 505,130

Claims priority, application Great Britain May 12, 1954

4 Claims. (Cl. 237—2)

In the chemical industry, as for example in drug manufacture, there are processes requiring a flow to the plant of sterilized gas under pressure, which need not be hot and in some cases must necessarily be cool. It may be desirable to sterilize the gas by raising it to a sufficiently high temperature; the gas can thereafter be cooled, and there will be considerable energy available in the rejected heat. This gas for carrying out the process is for convenience hereinafter called process air, but it may be impure air or perhaps another gas.

Although there is some loss of gas pressure in the plant during the process, the gas coming out of the plant—which is hereinafter called the outlet gas and may be the process air although, if a chemical change takes place in the plant, the outlet gas will be a different gas—will be at a pressure not much below that of the in-going process air and will contain considerable pressure energy.

The present invention uses the pressure energy in the outlet gas and the energy of the rejected heat as driving energy in a gas turbine which drives a compressor for compressing the process air before sterilization. Thus, according to the invention, a power plant for supplying pressurized process air which has been sterilized by heat consists of a compressor for the process air, means for heating the compressed process air to a sufficient temperature for sterilizing, a heat exchanger for transferring heat from the sterilized process air, upstream of the processing plant, to the outlet gas, downstream of the plant, and a gas-turbine receiving the reheated outlet gas as working fluid and driving the compressor. The heat transferred is sufficient to cool the process air to or considerably towards the temperature acceptable to the process plant and sufficient to raise the temperature of the outlet gas to a suitable inlet temperature for the turbine. Thus energy for driving the compressor is recovered from the heat used for sterilization.

If the process air can be combustion products or impure air containing such products, e. g. carbon dioxide, the heating means for sterilization can be simply a combustion chamber for burning liquid fuel in the compressed air.

Three particular arrangements according to the invention are shown in the accompanying drawings in which.

Figure 1:
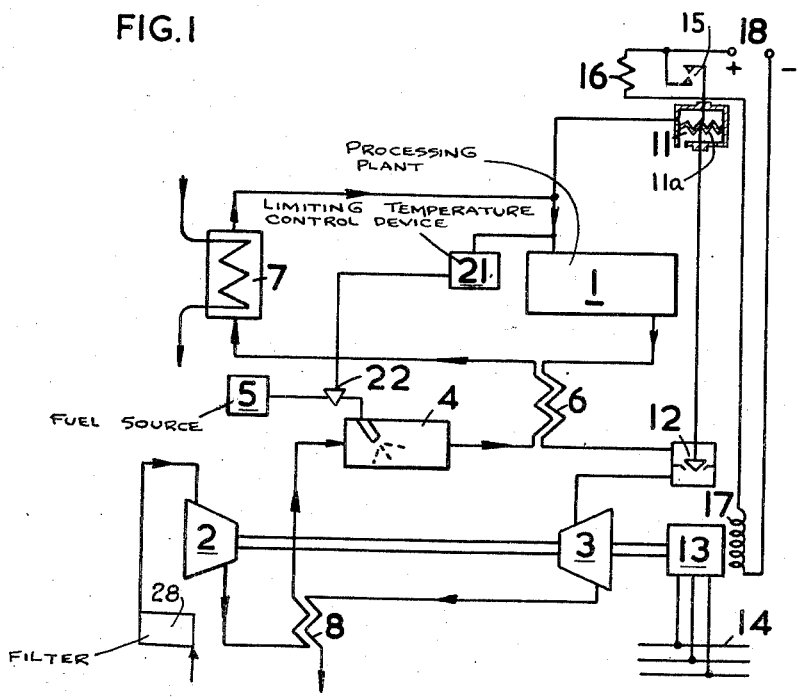
Fig. 1 is a schematic view of one arrangement of power and processing plant.

Figure 1 shows the plant 1 for carrying out the chemical process, an air compressor 2, a gas turbine 3 driving the compressor, a combustion chamber 4 and a main heat exchanger 6. The gas turbine 3 and compressor 2 can be of conventional form and both may for example be axial flow machines. The combustion chamber 4 can be of conventional gas turbine type with its burners supplied with liquid fuel from source 5. The chamber 4 is connected to the turbine 3 indirectly through the main heat exchanger 6, through the process plant 1 and thence again through the heat exchanger 6 to the inlet to the turbine. In some cases the gas leaving the heat exchanger may be too hot for the process plant 1 and accordingly there may be a cooler 7—of a kind using cooling water—between the heat exchanger 6 and the inlet to the plant 1. There is at least one extra heat exchanger 8 for transferring heat from the turbine exhaust to air leaving the compressor 2.

The compressor 2 draws in air from atmosphere and supplies all its output of compressed air to the combustion chamber 4 wherein enough fuel is burnt to heat the air sufficiently to render the turbo-compressor system 2—3 self-driving, and for sterilization. If desired, the air may be sucked into the compressor through or discharged from the compressor through a filter as shown at 28. Combustion gas—or, if the fuel is burnt in excess air, a mixture of air and such gas—leaves the combustion chamber 4 at a high temperature and passes through the heat exchanger 6 wherein it gives up a considerable part of its heat. The gas then passes through the cooler 7—which can conveniently and economically be a boiler feed-water heater—wherein its temperature is brought down to a low value acceptable to the process plant 1— e. g. in the range between a moderate atmospheric temperature and a value somewhat below the boiling point of water. This process air is supplied at this temperature and at a pressure which may for example be about 30 lbs. per sq. in (gauge) to the process plant. The outlet gas leaves the plant 1 at a lower temperature and a lower pressure—say 20 lbs. per sq. in. (gauge)— and in passing again through the heat exchanger 6 has its temperature raised again to a high value suitable for the gas turbine. The hot gas is then expanded through the turbine 3. The main heat exchanger 6 might in some cases be a regenerator but to assist in maintaining a high degree of sterility of the process air the heat exchanger is usually preferably a tubular recuperator with the tube joints carefully sealed to guard against leaking-in of any organism-laden air.

The plant may be controlled automatically by pressure-responsive means to maintain a particular inlet pressure to the processing plant. Thus Figure 1 shows by way of example means for use if the temperature to which the process air must be heated for sterilization is above that theoretically required for self-running of the compressor-turbine plant 2—3. The device 11 responsive to the pressure in the inlet duct to the processing plant 1 acts on a pressure rise, through flexing of the diaphragm 11a to cause a closing movement of a throttle valve 12 placed in the inlet duct of the turbine 3. Alternatively or additionally device 11 actuates means to control the output of a load-absorbing device 13 driven by the turbine 3 in addition to the compressor 2. This load device is shown as an electric generator 13 connected to a supply network 14. The pressure-responsive device 11, on rise of pressure, can close electric contacts 15 in parallel with resistance 16 to increase the excitation of generator 13 by its field winding 17 which is connected to the source of supply 18 in series with resistance 16. It will be understood that the plant could however be controlled to maintain a particular rate of flow to the plant 1. Furthermore, the limiting-temperature-responsive device 21 responds to a fall in temperature at the inlet to the process plant 1 to increase the fuel supply (e. g. by opening the throttle valve 22 between the fuel supply 5 and the chamber 4) and thus to ensure that the temperature to which the process air is heated does not fall below that required for sterilization.

Figure 2:
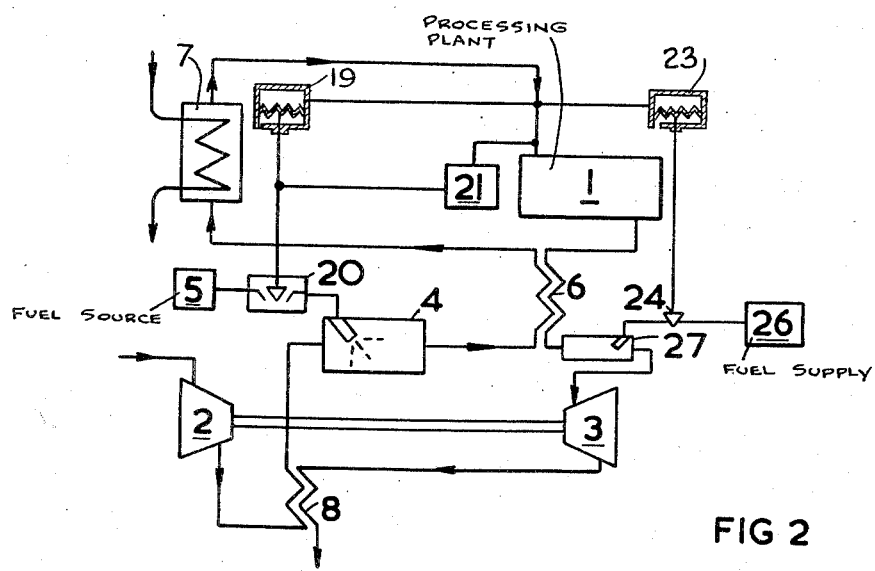
Fig. 2 is a similar view of an alternative arrangement.

Alternatively, if the temperature to which the process air must be heated in order that the plant 2—3 will be self-running is above that required for sterilization, a device 19 as shown in Figure 2 acts in response to a fall in the pressure in the inlet to plant 1 to open throttle valve 20 between the fuel supply 5 and the combustion chamber 4 to increase the fuel supply to and hence the temperature in the combustion chamber to maintain a particular inlet pressure to the processing plant 1. The limiting-temperature-responsive device 21 acts in response to a fall in temperature to exert an over-riding control on throttle valve 20 to open this valve and maintain the temperature required for sterilization. Other parts in Fig. 2 are represented by the same reference numerals as in Fig. 1. Assuming that the pressure drop in plant 1 is such that the energy available in the outlet gas is insufficient to operate turbine 3 to drive compressor 2, additional driving energy may be supplied on occasion. Thus, as shown, the gas going from the heat exchanger 6 to the turbine 3 may pass through combustion chamber 27 for re-heating. The device 23 responsive to the pressure at the inlet to the plant 1 can act on a fall of pressure to impart extra energy by increasing the fuel supply 26 to the combustion chamber 27, e. g. by opening valve 24 between the chamber and the supply.

Figure 3:
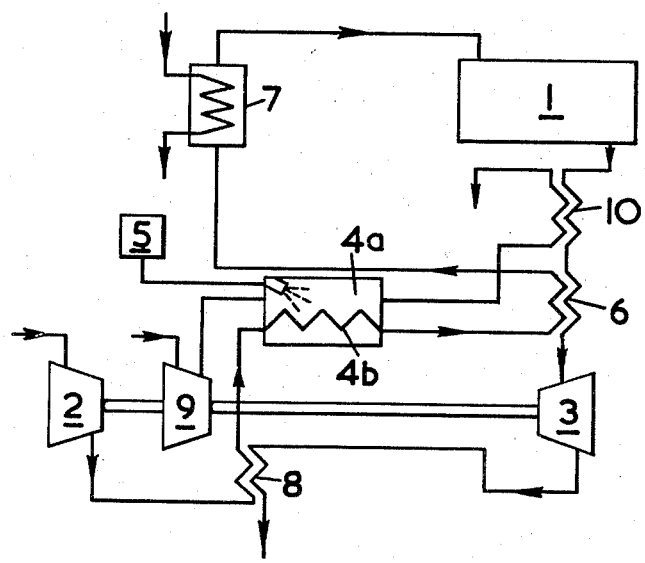
Fig. 3 is a similar view of a further alternative arrangement.

If the process air must be free of combustion products, the modified arrangement of Fig. 3 is used, with indirect heating. The process air passes through heating coils 4b in the combustion chamber 4a, which is fed with a separate supply of combustion air from the compressor or fan 9, the process air goes to the main heat exchanger 6 and the combustion gases discharged from the combustion chamber may go through an auxiliary heat exchanger 10, the outlet gas passing first through the auxiliary and then through the main heat exchanger. It will be understood that this plant can be controlled as described with reference either to Fig. 1 or to Fig. 2.

I claim:

1. In combination, a processing plant and a power plant for supplying thereto pressurized process air which has been sterilized by heat, comprising a compressor for the process air, means for heating the compressed process air to a sterilizing temperature, a heat exchanger for transferring heat from the sterilized process air, upstream of the processing plant, to the outlet gas downstream of the processing plant, a gas turbine connected to receive reheated outlet gas and in driving connection with the compressor, valve means for controlling the flow of outlet gas to the turbine and means for actuating said valve means responsively to the pressure of the process air at the inlet to the processing plant.

2. In combination, a processing plant and a power plant for supplying thereto pressurized process air which has been sterilized by heat, comprising a compressor for the process air, means for heating the compressed process air to a sterilizing temperature, a heat exchanger for transferring heat from the sterilized process air, upstream of the processing plant, to the outlet gas downstream of the processing plant, a gas turbine connected to receive the reheated outlet gas and in driving connection with the compressor, and means for controlling the said heating means responsively to the temperature at the air inlet to the processing plant.

3. In combination, a processing plant and a power plant for supplying thereto pressurized process air which has been sterilized by heat, comprising a compressor for the process air, means for heating the compressed process air to a sterilizing temperature, a heat exchanger for transferring heat from the sterilized process air, upstream of the processing plant, to the outlet gas down steam of the processing plant, a gas turbine connected to receive the reheated outlet gas and in driving connection with the compressor, means for imparting additional driving energy to the turbine and control means therefor responsive to the pressure of the pressurized process air.

4. In combination, a processing plant and a power plant for supplying thereto pressurized process air which has been sterilized by heat, comprising a compressor for the process air, means for heating the compressed process air to a sterilizing temperature, a heat exchanger for transferring heat from the sterilized process air, upstream of the processing plant, to the outlet gas downstream of the processing plant, a gas turbine connected to receive the reheated outlet gas and in driving connection with the compressor, fuel-burning means for further heating the gas immediately prior to the inlet to the turbine, means for supplying fuel to said fuel-burning means and means for controlling the rate of supply of said fuel responsively to the pressure of the pressurized process air.

References Cited in the file of this patent

FOREIGN PATENTS

| | | |
|---|---|---|
| 381,915 | Germany | Sept. 26, 1923 |
| 645,671 | England | Nov. 8, 1950 |